(12) United States Patent
Clement et al.

(10) Patent No.: US 7,349,970 B2
(45) Date of Patent: Mar. 25, 2008

(54) WORKLOAD MANAGEMENT OF STATEFUL PROGRAM ENTITIES

(75) Inventors: Andrew Simon Clement, Fair Oak (GB); Ann Eleanor Dalton, Southampton (GB); Barry Dickinson, Eastleigh (GB); Thomas James Freund, Winchester (GB); Jonathan Peter Hoare Lawrence, Oxford (GB); Ian James Mitchell, Eastleigh (GB); Glyn Normington, Winchester (GB); Steven Powell, Winchester (GB); R. Anthony Storey, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 10/469,563

(22) PCT Filed: Mar. 29, 2001

(86) PCT No.: PCT/GB02/01032
§ 371 (c)(1),
(2), (4) Date: Aug. 29, 2003

(87) PCT Pub. No.: WO02/079973
PCT Pub. Date: Oct. 10, 2002

(65) Prior Publication Data
US 2004/0078782 A1   Apr. 22, 2004

(30) Foreign Application Priority Data
Mar. 29, 2001   (GB) ................. 0107967.2

(51) Int. Cl.
*G06F 15/16* (2006.01)
*G06F 9/445* (2006.01)
*G06F 9/44* (2006.01)

(52) U.S. Cl. ............... 709/228; 709/201; 709/202; 709/203; 709/227; 718/1; 719/330

(58) Field of Classification Search ........ 709/227–229, 709/201–203
See application file for complete search history.

(56) References Cited

U.S. PATENT DOCUMENTS 5,862,327 A * 1/1999 Kwang et al. ............. 709/203

(Continued)

FOREIGN PATENT DOCUMENTS

EP    WO00/28464    5/2000

OTHER PUBLICATIONS

An Infrastructure for the Dynamic Distribution of Web Applications and Services, Enrique Duvos, Azer Bestavros, Department of Computer Science Boston University, Dec. 2000. BUCS-TR-2000-027.

(Continued)

*Primary Examiner*—Bunjob Jaroenchonwanit
*Assistant Examiner*—Hieu Hoang
(74) *Attorney, Agent, or Firm*—Duke W. Yee; Jeffrey S. LaBaw; Peter B. Manzo

(57) ABSTRACT

In a workload managed system comprising a plurality of server processes each capable of supporting a given program entity, such as an Enterprise JavaBeans™ specified stateful session bean, a stateful session bean instance is passivated, by writing it to a bean store, on completion of a unit of work. On next use the session bean is reactivated, by reading it from the bean store, in any one of the plurality of servers thereby allowing workload management for stateful session beans. A routing table is maintained, in non-volatile mass storage, that contains location information for units of work and stateful session bean instances, used to maintain unit of work-server affinity for the lifetime of the unit of work. Stateful session beans instances are associated with ID keys that include a flag that is used to indicate whether or not the routing table contains location information for the bean instance.

18 Claims, 8 Drawing Sheets

U.S. PATENT DOCUMENTS

| | | | |
|---|---|---|---|
| 6,199,066 B1* | 3/2001 | Glitho et al. | 707/10 |
| 6,236,999 B1* | 5/2001 | Jacobs et al. | 707/10 |
| 6,457,065 B1* | 9/2002 | Rich et al. | 719/328 |
| 6,571,274 B1* | 5/2003 | Jacobs et al. | 709/203 |
| 6,581,088 B1* | 6/2003 | Jacobs et al. | 718/105 |
| 6,944,680 B1* | 9/2005 | Lee et al. | 709/249 |
| 2002/0004856 A1* | 1/2002 | Sudarshan et al. | 709/330 |
| 2002/0023173 A1* | 2/2002 | Jacobs et al. | 709/245 |
| 2003/0115376 A1* | 6/2003 | Drobychev et al. | 709/328 |
| 2003/0229529 A1* | 12/2003 | Mui et al. | 705/8 |

OTHER PUBLICATIONS

Sun Microsystems, Enterprise JavaBeans™ Specification, Version 2.0 Linda G. DeMichiel, L. Umit Yalcinalp, Sanjeev Krishnan.

* cited by examiner

Fig.6

Bean Store

- 602: B1: beans=1
- 604: (empty)
- 606: B1: beans=2
- 608: (empty)

Routing File

- 601: T1 : server1
- 603: T1 : server1
- 605: (empty)
- 607: B1 : server2

1. T1 in server 1
   B1 not accessed

2. T1 in server 1
   B1 active in T1

3. No transaction
   B1 passivated

4. T2 in server 2
   B1 active in server2

WORKLOAD MANAGEMENT OF STATEFUL PROGRAM ENTITIES

FIELD OF THE INVENTION

The present invention relates to Workload Management of program entities that maintain state in volatile memory and more specifically to the relocation of objects, such as stateful session beans of the Enterprise JavaBeans™ architecture.

BACKGROUND TO THE INVENTION

Workload management in client-server enterprise systems is now common place. In a workload managed system a groups of server processes (workgroups) are set up such that each server process in the workgroup has similar capabilities. This enables every server process in the workgroup to process a given request (or message) on behalf of a client. When a client sends a request to a workgroup, a workload management unit decides which server process in the workgroup to assign the request to. This is usually based on a user defined policy which could, for example, be least busy or round robin. This hopefully ensures that server process resources are used efficiently and clients are much less likely to suffer poor responses due to bottlenecks caused by a single server process simultaneously running requests for many clients.

A typical workload managed system is shown in FIG. 1. The system comprises many clients (10) communicating, over a network (11), with a workload management unit (12). The workload management unit (12) distributes work, over the network (11), to a workgroup comprising two server processes, each server processes running in a server (13 and 14). When a client makes a request the workload management unit receives the request and selects a server process to allocate it to. The workload management unit may be part of one or more server processes that make up the workgroup.

Ideally in such systems the workload management unit is free to select a server process, based on the chosen policy, for each client request received as this enables better distribution of work. However this is not always possible. For example, in one request a client can create an object instance, in a given server process, which contains data that the client requires access to in subsequent requests. For the client to work correctly the workload distribution unit must ensure that the client obtains access to the correct object instance. This can be done either by maintaining some element of client-server affinity, for the lifetime of the client, that ensures a client returns to the server process in which an object instance was created when the client next requires access to it, or by enabling an object instance to move between server processes, without loss of state, between requests. If the only option available is client-server affinity, workload distribution will be adversely affected because it may only be possible to workload manage a subset of a clients requests, and it is difficult, if not impossible, to predict the load a client is likely to impose on a server process when the client-server affinity is fixed.

It is therefore preferable to enable objects to move server processes between requests. This is fairly straightforward for objects that maintain state data in a database (or file) as the object instance can access the database or file from any server process in the workgroup. As a result the object instance can be moved to any server process although, if it is taking part in transaction, the object cannot be moved until the transaction is completed, as database changes made during the transaction will only be hardened to the database when the transaction commits. However, if an object instance holds the state data in volatile memory, it cannot easily be moved between server processes. This is because volatile memory is only normally accessible from the server process that allocated it. As a result, if a client uses this type of object, client-server affinity is enforced and workload management is subject to the discussed limitation.

This is can be illustrated by looking at a particular programming model employed in such workload managed client-server enterprise systems. A good example is the industry standard Enterprise JavaBeans™ (EJB™) programming model. This model is fully defined in the Enterprise JavaBeans v1.1 Specification, available from Sun Microsystems, Inc., included here by reference. Some features of this specification are now described for clarity The Enterprise JavaBeans v1.1 Specification describes classifications of EJBs (objects), that run in server processes, based on their functionality. Two classifications are session beans and entity beans. Session beans typically: execute on behalf of a client; can access a database but do not represent a database; are short-lived; and are not recoverable. Entity beans typically: are accessible to multiple clients; represent a database; can be long lived; and are recoverable. Session beans are further classified as either stateless or stateful. A stateless session bean instance does not contain a conversational state such that a client can use any instance of the session bean. However, a stateful session bean instance does contain conversational state that a client may require repeated access to. As a result a client must always access an instance of a stateful session bean with the required state. As this state is at least partially held in volatile memory this usually requires the client to always access the same instance of a stateful session bean.

EJB containers provide an execution environment, in a server process, for EJBs. The Enterprise JavaBeans v1.1 Specification specifies contracts between clients and containers and between an EJB and its container. Part of the contract between the container and the client is the provision of a home for an EJB to which the client can go to create new EJB instances and to locate existing EJB instances. Part of the contract between an EJB and its container specifies methods that an EJB must implement to enable the container to provide a bean instance with access to container services and to issue notifications to the bean instance. These methods vary according to the type of bean. For example, two methods a stateful session bean must implement are ejbActivate( ) and ejbPassivate( ). ejbPassivate( ) is called on a bean instance when the container is about to passivate the bean instance by serializing it and writing it to disk. This may be done for a variety of reasons, such as the server process in which the bean was instantiated is running low on memory and/or the bean instance has not been accessed for a specified time period. However, because session beans can be transaction aware, the container cannot passivate a bean instance when it is taking part in a transaction. In the ejbPassivate( ) method the bean instance must ensure that its conversational state, which is at least partially held in memory, can survive passivation and so, for example, it must close any JDBC™ connections it has opened. Once a bean instance has been passivated it is reactivated by reading its serialized form from disk, de-serializing it, and then calling its ejbActivate( ) method. As a result, in the ejbActivate( ) method the bean instance might, for example, reopen any JDBC connections that were closed during passivation.

FIG. 2 is a schematic representation of the EJB programming model described. It shows an EJB server process (20)

that provides an EJB container (201). For each EJB implemented an EJB Home (202) is provided which can be used by a client (10) to create an instance of that EJB (203). The EJB server process (20) may provide homes for many EJB implementations. An EJB instance (203) executes in the environment provided by the EJB container (201) and once an instance has been created, a client (10) can send requests to it. At any moment in time there can be many instances (204, 205) of the EJB that might have been created by the same or different clients.

FIGS. 3a and 3b are schematic representations of stateful session bean passivation and re-activation. FIG. 3a shows passivation of an instance of a stateful session bean named BeanCounter which maintains, in volatile memory, a counter of beans. During passivation the BeanCounter instance (302) is removed from volatile memory in EJBServer (20) and written to the bean store (303), on disk, in its serialized form (304). The serialized form contains the conversational state (beans=5) of BeanCounter instance (302). BeanCounter instance (302) is drawn with dashed lines to indicate that it is removed from volatile memory and at the end of passivation it only exists on disk in its serialized form (304). FIG. 3b shows re-activation which is the reverse of passivation. The serialized form of the bean instance (304) is read from disk and reactivated as BeanCounter instance (302). After re-activation the instance exists in volatile memory and contains the conversational state (beans=5) that it contained before passivation. The serialized form of the bean instance (304) may or may not exist on disk after this process.

It can now be seen that, in a workload managed system that uses the EJB programming model, the workload management unit must be sensitive to the type of EJBs that a client has previously accessed. For example, if a client only accesses stateless session bean instances, any request from a client can be allocated to any server process, in a workgroup, by the workload management unit, based on the chosen allocation policy. This is because these beans do not contain conversational state. If a client accesses entity bean instances they can also move server process, but only between transactions, because entity beans maintain state in a database and are transactional. However, if a client creates and accesses a stateful session bean instance, because the instance may contain conversational state in volatile memory, the client will assume an affinity with the server process in which the bean was created, for the lifetime of the client, such that all subsequent requests from the client to the bean instance are given to the same server process. If the bean is passivated between requests, the bean is reactivated in the server process when the first request after passivation is received.

One example of a product that provides a workload managed system that uses the EJB programming model is the BEA Weblogic Server™ 6.0 product of BEA Systems, Inc. This product refers to workgroups as Server Clusters. Workload management is provided in two forms. EJB home objects can have a cluster-aware home stub that has knowledge of all EJBHome objects on all server processes in the cluster. This stub provides workload balancing for client requests to create and find EJB instances. EJBs can have a replica-aware EJBObject stub that maintains knowledge of all copies of the EJB that reside on server processes in the cluster. The EJBObject stub provides load balancing and fail-over services for EJB method calls. Stateless session beans can be replica-aware and have cluster-aware homes, such that all requests to create and access stateless session bean instances can be workload managed. However, stateful session beans can only have cluster aware homes and so only calls to create stateful session beans can be workload managed. All requests to a stateful session bean instance are generally given to the same server process. One exception to this is provided using in-memory replication of stateful session bean instances. With in-memory replication the stateful session bean is given a cut-down replica aware object stub that maintains a primary server process instance on which the bean instance runs, and a secondary server process instance to use for replicating the bean's state. Now if a client modifies the bean instance's state under the scope of a transaction, when the transaction is committed the bean instance's state is replicated in volatile memory in the secondary server process. Should the primary server process of the bean instance fail, a client request is re-routed to the secondary server process, which becomes the primary server process, and a new secondary server process is allocated from the cluster. In this situation the client automatically gets access to the last committed state of the bean. This provides fail-over support for stateful session beans rather than workload management, and requires the server to co-ordinate deletion of the in-memory copy of the bean instance. It can also be seen that if a stateful session EJB instance has been modified in an incomplete transaction, when the primary server fails, the next request to the EJB instance will not fail but will lose the uncommitted change. As a result a client can never be sure whether a stateful session bean instance has lost uncommitted updates.

SUMMARY OF THE INVENTION

There is thus a need to provide workload management for program entities that contain state data that is held in volatile memory.

According to a first aspect the present invention provides a data processing method for running on a data processing system, said data processing system having a non-volatile memory storage device, the method comprising the steps of: passivating, as part of a server process, an instance of a program entity by writing it to a program entity store, on said storage device, and removing it from said server process; and reactivating, as part of a server process, an instance of said program entity by reading it from said program entity store and re-creating it in said server process; characterised in that the server processes that passivate and subsequently reactivate a particular program entity instance are different, and by the step of selecting the server process in which said particular program entity instance is reactivated according to a workload distribution algorithm.

According to a second aspect the present invention provides a computer program product for carrying out the data processing method described above.

According to a third aspect the present invention provides a data processing system comprising: at least one server; a plurality of server processes, capable of running on said at least one server, each with support for a program entity; and a non-volatile memory storage device, accessible to each server process; wherein each server process comprises: means for passivating an instance of said program entity by writing it to a program entity store on said storage device; and means for reactivating an instance of said program entity by reading it from said program entity store and using it to recreate said program entity instance; characterised in that the means for reactivating can reactivate program entity instances that were passivated by the passivating means of a different server process, and by a means for selecting the server process in which said particular program entity instance is reactivated according to a workload distribution algorithm;

Thus the present invention enables instances of program entities, that maintain state data in volatile memory, to move between server processes, by passivating them in one server process and reactivating them in a second server process. As a result, requests to access the program entity instance can be subject to workload management if the entity moves server processes between requests, the server process to which it moves being chosen by the workload management unit. The state data of the program entity is maintained because the passivating step writes the serialized form of the program entity instance to disk and the reactivating step de-serializes the serialized form when recreating the program entity instance.

Preferably the program entity for which workload management support is provided is an instance of a stateful session bean of the Enterprise JavaBean specification. As a result passivation and reactivation involve the ejbPassivate( ) and ejbActivate( ) methods as described for Enterprise JavaBeans. Alternatively the program entity could be an instance of, for example, a Java bean or a C++ object.

Preferably the present invention further provides workload management for units of work that involve a program entity instance. A unit of work delimits one or more events, such as requests, into a single unit. Preferably the unit of work is a CORBA Object Transaction Service transaction. Alternatively a unit of work could be, for example, a different type of transaction, a session, a business method, an IBM CICS unit of work, or a client request. An example of other another type of transaction is a Java Transaction API transaction. This is achieved by passivating the program entity on completion of, but not during, the chosen unit of work.

Preferably the present invention further guarantees to a client that a program entity instance accessed under a unit of work, such as a transaction, cannot be re-accessed outside the scope of the unit of work until the unit of work is completed. As a result if the unit of work fails to complete, for example because the server process in which it was executing fails, the program entity instance will cease to exist. This can be achieved by ensuring that the program entity instance is removed from the program entity store during reactivation.

Preferably a routing table containing information that can be used to locate a program entity instance is provided. A program entity instance could be active, in any one of the plurality of server processes that provide support for the program entity, or, at a different time, could be passive in the bean store. The routing table can then be used, on receipt of a request to access the program entity instance, to direct the request to the server process in which the program entity is currently active, or to any server if the program entity is currently passive. The presence the program entity in the program entity store can be indicated by the absence of an entry relating to the program entity in the routing table.

Preferably access to the routing table is reduced. This can be achieved if the key which is associated with a program entity instance, and is used for identifying a program entity as a target for a request, includes a flag to indicate the presence of location information for the program entity instance in the routing table. This flag may then be used, on receipt of an inbound request, to decide whether or not to look in the routing table for the location of a bean instance. For example, the key associated with a stateful session bean instance can include a flag to indicate that the bean instance is involved in an incomplete bean managed transaction. This may be the only case in which the routing table will include location information for the bean instance and so when a request is received for a bean instance the routing table need only be searched if the bean instance key has the bean managed flag set.

BRIEF DESCRIPTION OF THE DRAWINGS

A preferred embodiment of the present invention will now be described by making reference to the following drawing figures:

FIG. 6 is an illustration of the type of information held on disk to enable workload management of stateful session beans according to the preferred embodiment of the present invention.

DETAILED DESCRIPTION OF THE PREFERRED EMBODIMENT

Figure 1:
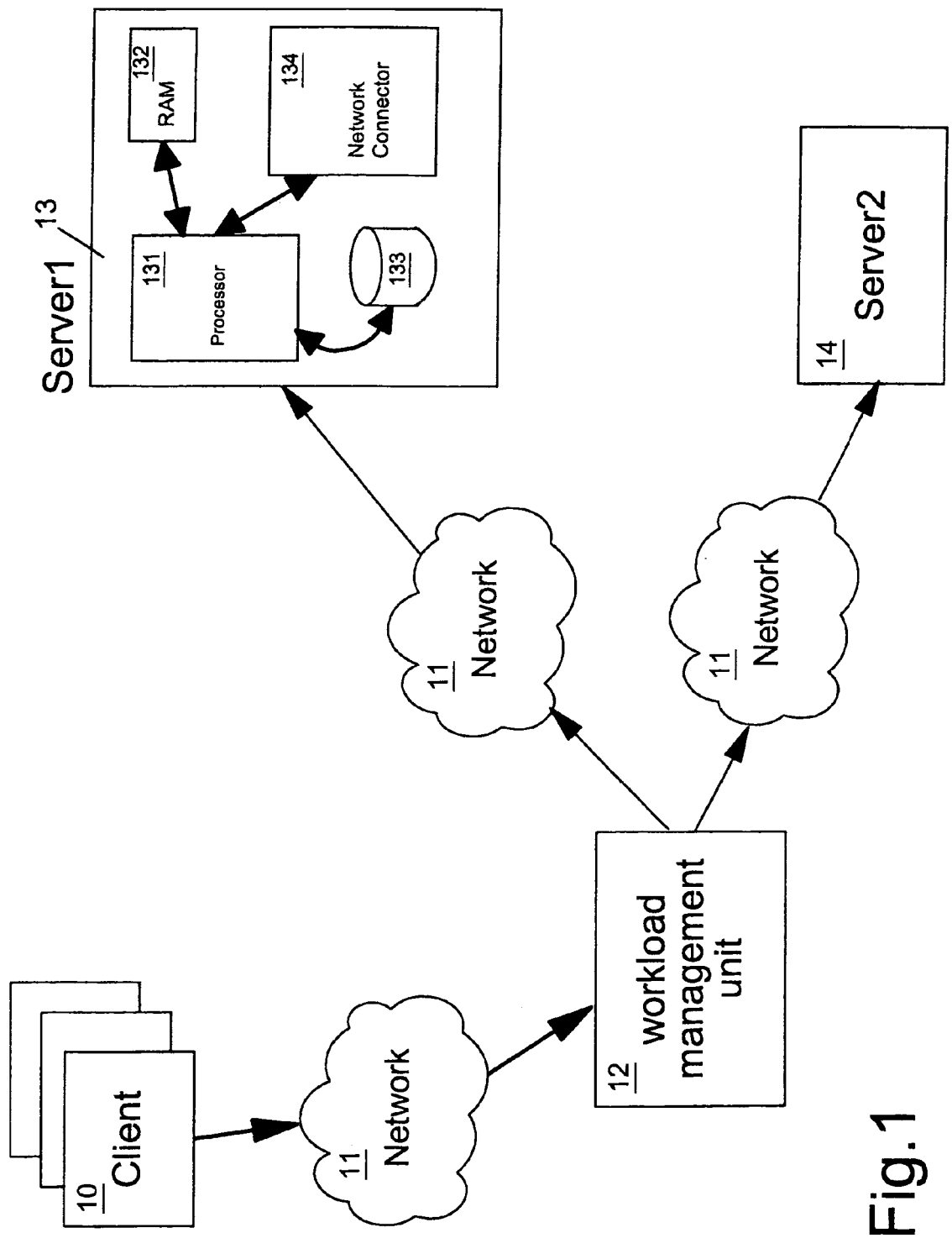
FIG. 1 is a block diagram of data processing environment in which the preferred embodiment of the present invention is advantageously applied.
Figure 2:
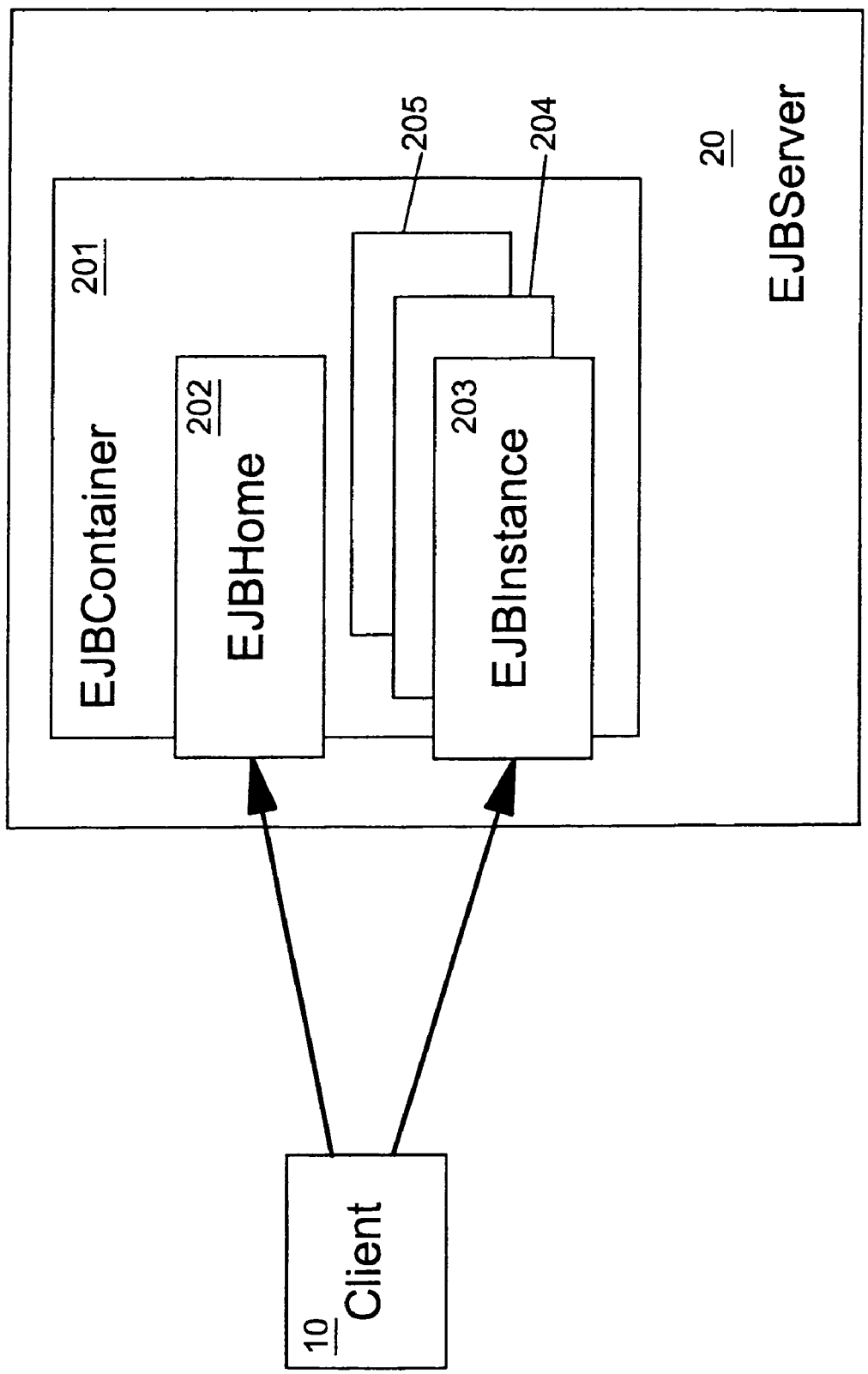
FIG. 2 is a schematic representation of Enterprise JavaBeans features relevant to the present invention and to which the present invention can be advantageously applied.
Figure 3B:
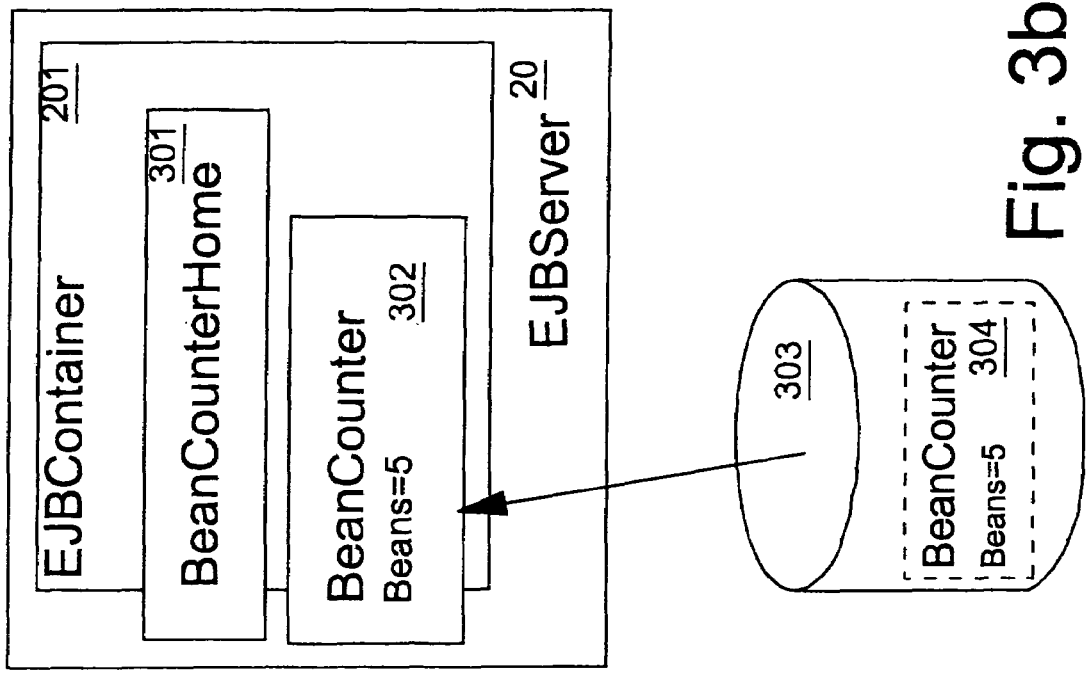
FIGS. 3a and 3b are schematic representations of stateful session bean passivation and reactivation, respectively, according to the Enterprise JavaBean specification.
Figure 3A:
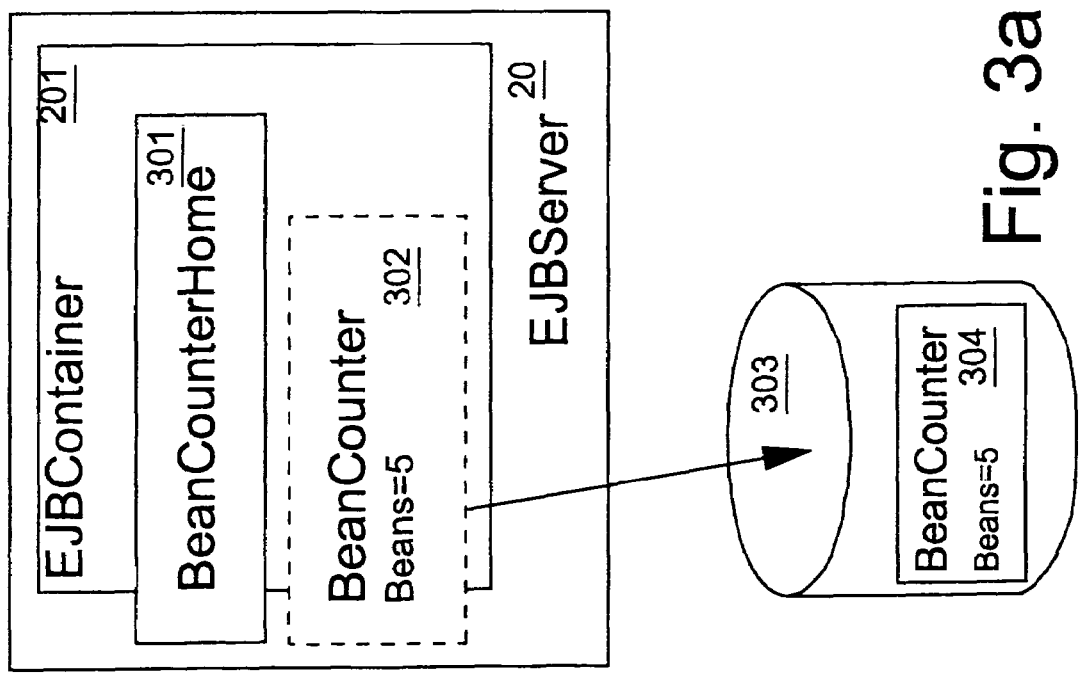

FIG. 1 shows the data processing environment in which the preferred embodiment of the present invention is advantageously applied. In the figure, client data processing apparatuses (10) connect to a workload management unit apparatus (12), through a network (11) which could be, for example, the Internet. The clients send requests (or messages) to the workload management unit apparatus (12) which distributes the requests, through the network (11), to data processing servers, Server1 (13) and Server2 (14), each of which include a server process to process those requests. The server processes of Server1 (13) and Server2 (14) are capable of processing equivalent requests and constitute a workgroup. Although in this embodiment the workgroup comprises two server processes each from a different data processing server, in other embodiments a data processing server can include one or more server processes and the workgroup can comprise two or more server processes from one or more data processing servers.

Server1 (13) has a processor (131) for controlling the operation of the server, a RAM volatile memory element (132) for temporarily storing data such as the in memory instance of a stateful session bean, non-volatile memory (133) for storing such data as the serialized form of a passivated stateful session bean, and a network connector (134) for use in interfacing with the network (11). Although not shown, clients (10), the workload management unit (12) and server 2 (14) are composed of the same components (131, 132, 133, 134) as server1 and the non-volatile memory (133) of at least one server must be accessible to other servers in the workgroup. It should be noted that, in the preferred embodiment, although the workgroup is made up of 2 servers, in other embodiments the workgroup may be made up of more than 2 servers. Also in the preferred embodiment the clients (10) and workload management unit (12) are shown separate from the servers (13 and 14) that constitute the workgroup but, in other embodiments one or more of these could also be servers in the workgroup. In addition, in the preferred embodiment, server 1 (13) comprises a single components (131, 132, 133, 134) but in other embodiments there could be a plurality of one or more of these and conversely one or more servers in the workgroup can share these components.

In the preferred embodiment: the workgroup provides support of the Enterprise JavaBeans programming model and as such provides support for stateful session beans; the transaction service provided is a CORBA compliant Object Transaction Service (OTS); and the workload management unit provides support for transaction affinity, such that all requests under a given transaction, are processed by the same server process in the workgroup.

Figure 4A:
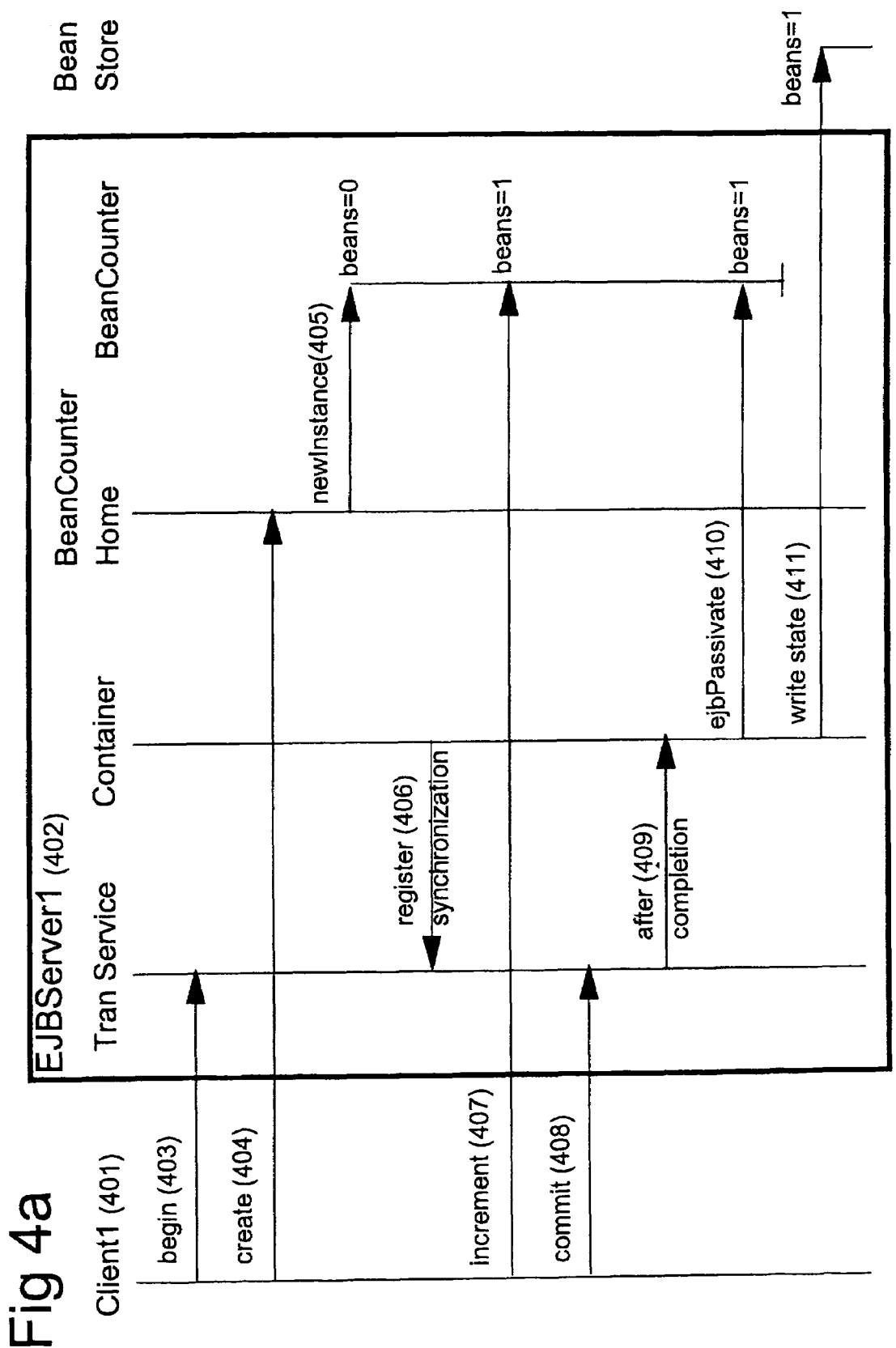
FIGS. 4a and 4b are sequence diagrams of the flows involved between major components in the preferred embodiment of the present invention.
Figure 4B:
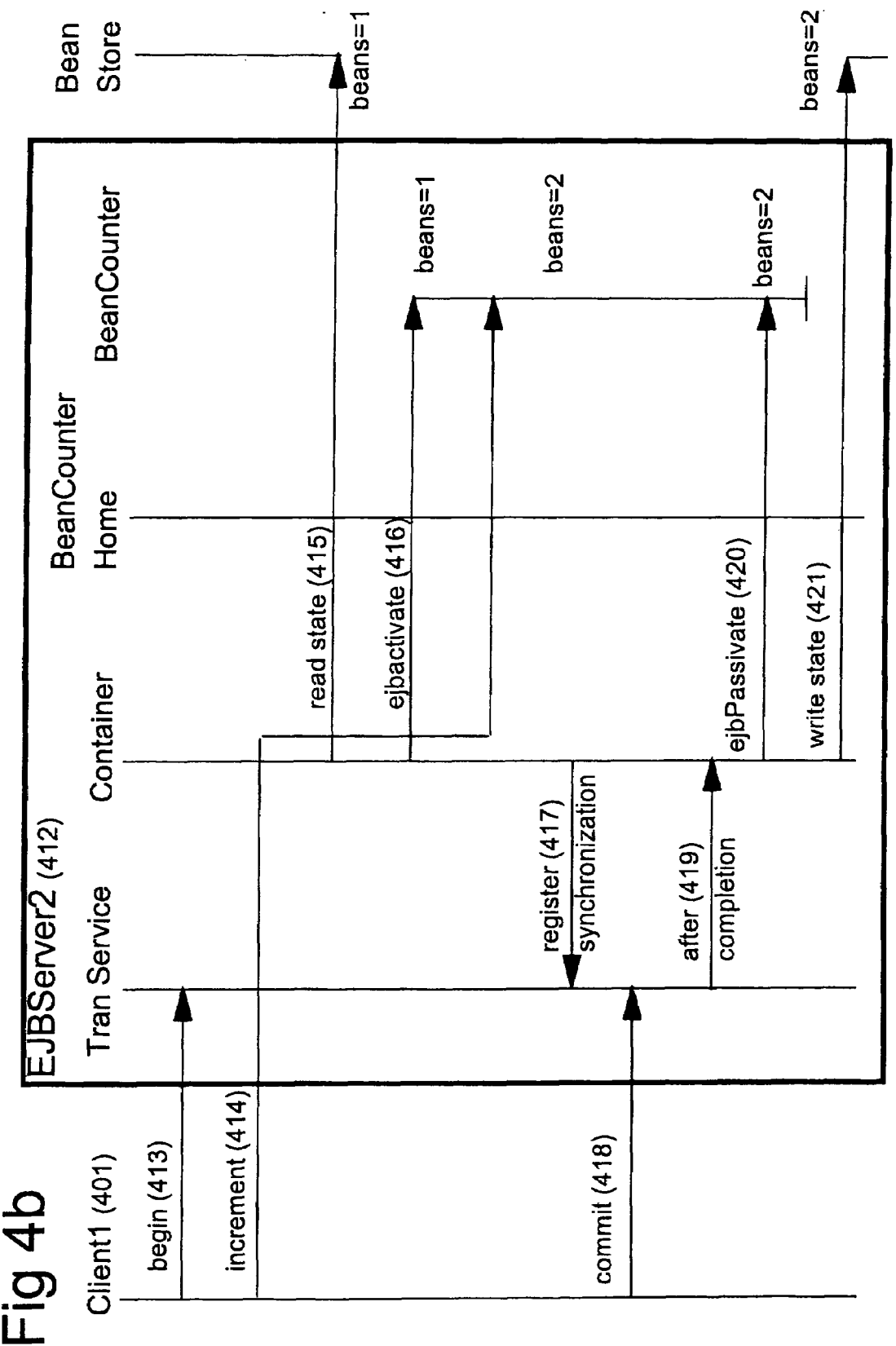

FIGS. 4a and 4b show the sequence of flows that could result, under the preferred embodiment of the present invention, from a client that creates and accesses a given stateful session bean instance under the scope of two separate client initiated transactions. Note, however, that the flows shown are merely the interesting subset of flows, relevant to the preferred embodiment, that would actually occur. In this example, the given stateful session bean is the BeanCounter bean that is used by the client to count beans over the lifetime of the client. Although this is a somewhat simplistic stateful session bean, the bean count does have a conversational state that is held in memory which is adequate for the purposes of this description. However, it should be note that the invention applies equally to any given stateful session bean instance which, in practice, is likely to be more complex and could also access data in a database.

FIG. 4a shows the processing of the client's first transaction. The client (401) issues a begin transaction request (403) which the Workload Management unit (not shown) assigns to the Transaction Service in EJBServer1(402) and establishes the transaction's affinity with this server process. After the transaction has been started the client locates the BeanCounter Home and sends a create request (404) to it. The Workload Management unit allocates this request to EJBServer1(402) to maintain transaction-server affinity, and the BeanCounter Home instantiates a new (405) BeanCounter instance with an initial state of beans=0. Before returning from the create request, the container being aware that a BeanCounter instance has been created under a transaction, issues a register_synchronization request (406) to register a container owned synchronization object with the transaction service. This ensures that the container will be called with after_completion during transaction completion processing. The client's next accesses the BeanCounter instance when it issues an increment request (407) which updates the beans state to beans=1. The workload management unit also allocates this request to EJBServer1(402) to maintain transaction-server affinity. When the client is ready to complete the transaction it issues a commit request (408) to the transaction service which, as part of commit processing calls after_completion (409) on the container registered synchronization object. This object then calls ejbPassivate (410) on the BeanCounter instance because under the present invention stateful session beans instances accessed under the scope of a transaction are passivated on completion of that transaction. In this example the BeanCounter instance has nothing to do in ejbPassivate as it has no open JDBC connections and its state is serializable. Following calling ejbPassivate the container serializes the BeanCounter instance, removes it from volatile memory and writes it (411) to the bean store. The bean store is not recoverable and is held in non-volatile storage which in the preferred embodiment is a hard disk. On completion of the transaction the Workload Management unit cancels the transaction's affinity with EJBServer1 (402).

Note that in FIG. 4a the transaction is committed, although the processing described would be the same if the commit request (408) had been a rollback request. In addition whilst the preferred embodiment uses a synchronization object and the after_completion method to facilitate passivation of the bean instance on transaction completion, other embodiments may adopt different methods.

Processing now continues in FIG. 4b which shows the client's second transaction. The client (401) issues a begin transaction request (413), the Workload Management unit (not shown) assigns this to the Transaction Service in EJBServer2 (412) and establishes the transaction's affinity with this server process. The client then issues a increment request (414) to the BeanCounter instance. This request is assigned to EJBServer2 (412) based on the established transaction-server affinity. The container, realizes that the bean instance is not in volatile memory and reads and removes it (415) from the bean store. The bean instance is then de-serialized into volatile memory and the ejbActivate method (416) is called on it. In the example the Bean Counter instance has nothing to do in ejbActivate to regain its state. The increment request (414) is then passed to the BeanCounter instance which updates its state to beans=2. Before the increment method returns the container notices that this is the first use of the BeanCounter instance in this transaction and so it issues a register_synchronization request (417) to register a container owned synchronization object with the transaction service. This ensures that the container will be called with after_completion during transaction completion processing. When the client is ready to complete the transaction it issues a commit request (418) and processing continues in the same way as described for FIG. 4a starting with the commit request (408).

Thus a stateful session bean instance has moved server process between transactions and as a result each transaction has been subject to workload management. In the absence of the present invention the creation (404) of the stateful session bean instance would have established a client-server affinity that would result in all of the client's transactions being run in the same server process.

It should be noted that although the above example considers client initiated transactions, the invention also applies to container or bean initiated transactions. For container and bean initiated transactions the flows involved would be reasonably similar to those described. In such scenarios the difference in the preferred embodiment would be that the methods invoked by the client (10) in FIGS. 4a and 4b would be issued by different entities. For example the container of a different EJB, or another EJB instance, could issue the begin (403, 413) and commit (408, 418) requests, and another EJB instance, or the client, could issue the create (404) and increment methods (407, 414).

Further, container managed transactions are started and completed within a single client request. As a result a stateful session bean instance, accessed as part of a container managed transaction, is passivated on completion of every client request. This allows workload management of all client requests that use container managed transactions. It can then be seen that, in the absence of a transaction, the container can also passivate stateful session bean instances on completion of a non transactional request thus allowing workload management of all client requests even if a stateful session bean instance is accessed.

Figure 5:
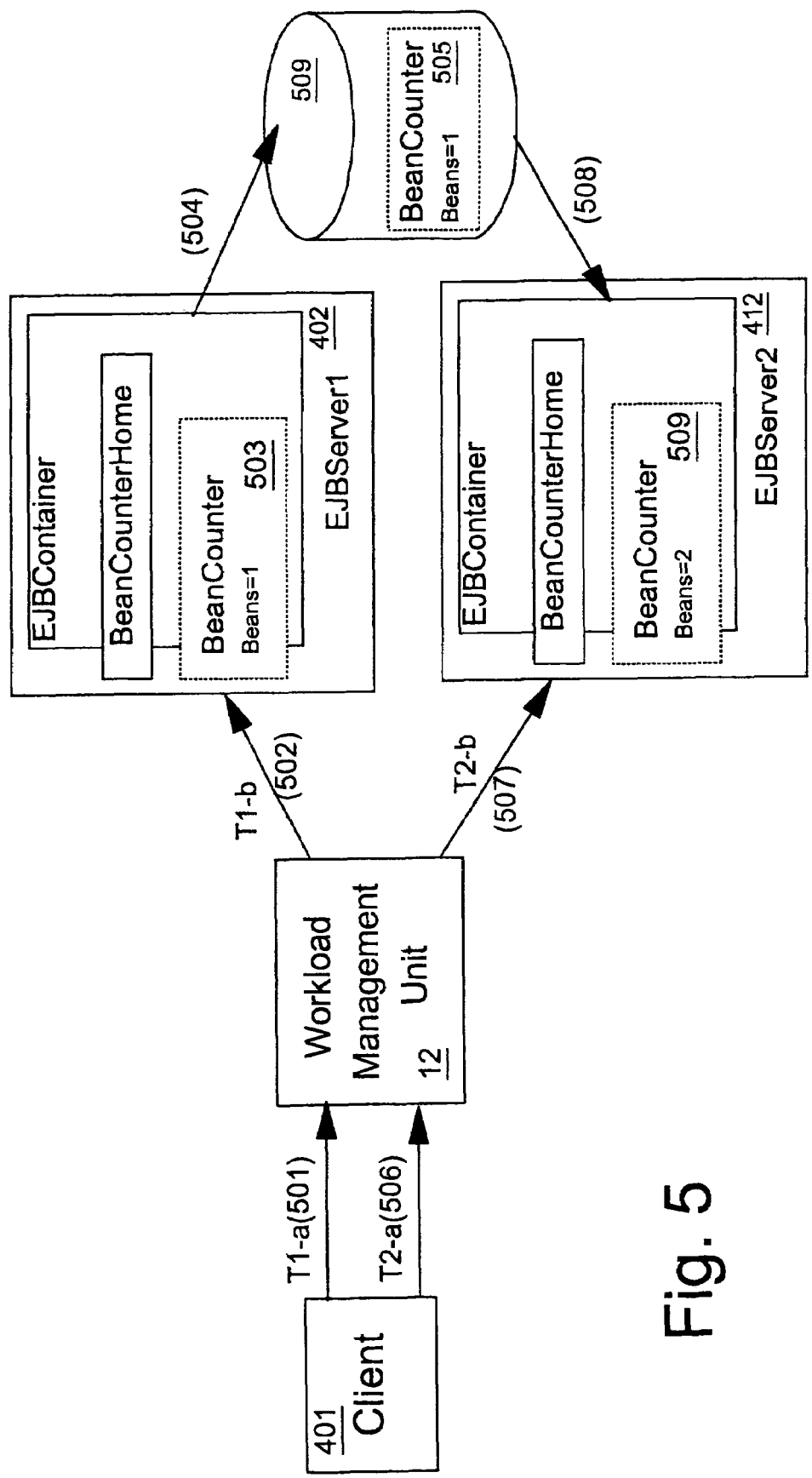
FIG. 5 is a schematic representation of the preferred embodiment of the present invention.

FIG. 5 is a schematic representation of the transactions shown in FIGS. 4a and 4b according to the preferred embodiment of the present invention. The Client (401) runs two transactions T1 and T2 and in the course of each transaction the BeanCounter instance (503) is accessed. T1-a (501) represents the requests that the Client (401) makes as part of transaction T1. The workload management unit (12) routes all of these requests to EJBServer1 (402) and these requests are represented by T1-b (502). On completion of the transaction the serialized representation of the Bean-Counter instance (503) is written (504) to the bean store (509) and removed from memory in EJBServer1 (402). T2-a (506) represents the requests that the Client (401) makes as part of transaction T2. The workload management unit (12) routes all of these requests to EJBServer2 (412) and these requests are represented by T2-b (507). The first time T2 accesses the BeanCounter instance it is reactivated in EJB-Server2 (402) by reading and removing (508) it from the bean store (509) and re-instantiating it in memory in EJB-Server2. As a result T2 has access to the state of the BeanCounter instance that was left by T1 even though T1 was run in a different server. T2 then increments the bean instance's state to beans=2.

FIG. 6 is an illustration of the type information held in non-volatile storage to enable workload management of stateful session beans according to the preferred embodiment of the present invention. The contents of two files, the routing file, which is recoverable, and the bean store, which is non-recoverable, are shown for a sequence of states that can be achieved under the present invention. Note that the contents shown are details of the information held rather than the actual contents of the files because there are many ways that the information could be held. Also the states are not exhaustive but serve to illustrate the concept.

In the first state shown in FIG. 6 there is an active transaction, with ID T1, in server1 and a passivated session bean instance, with key B1, in the bean store. The routing table contains (601) representations of the transaction id (T1) and the server process in which the transaction was started (server1). This information is used to maintain transaction-server affinity such that all requests that are part of transaction T1 are routed to server1. The bean store contains (602) the session bean key (B1) and its conversational state (beans=1). In this state any attempt to access the bean instance from any server process in the workgroup will succeed.

The second state in FIG. 6 is follows on from the first state after the bean instance B1 has been reactivated under the scope of transaction T1. The routing table contents (603) are unchanged but the record of the bean instance has been removed from the bean store which now has no record (604) of bean instance B1. This is because the bean instance B1 is now in volatile memory in server1 and so any attempt to access it will succeed from server1, but fail from any other server process in the workgroup.

The third state in FIG. 6 follows on from the second state after transaction T1 has been committed. The routing table now has no record (605) of completed transaction T1 as the transaction-server affinity has been dropped. The bean store contains (602) the session bean key (B1) and its updated conversational state (beans=2), indicating that the bean instance was passivated during transaction completion.

The fourth state in FIG. 6 follows on from the third state after passivated bean instance B1 has been accessed, from server 2, under a bean managed transaction that is not yet complete. The routing table contains (607) the bean instance key B1, and the server process in which the bean is currently active (server2). Further the bean instance key B1 includes a flag to indicate that the bean is being accessed under a bean managed transaction. This ensures that the next attempt to accesses the bean instance will be routed to server2. The bean store has no record (608) of the bean instance B1 which is now active. This state will remain, until the bean managed transaction is completed at which point the bean will be passivated and state will return to a state equivalent to the third state in FIG. 6 where the routing file no longer has a record of the bean key and the bean store contains the session bean instance.

The states shown in FIG. 4 constitute all but one of the states possible in the preferred embodiment. The state not shown is where the routing table does not contain the bean instance's key or the ID of the transaction under which it is being accessed and bean store does not contain a record of the bean instance. This state can be achieved by either the bean instance not existing or the bean instance being active in a server process either outside the scope of a transaction or as part of a container managed transaction.

It has therefore been shown that in the preferred embodiment of the present invention the serialized form a session bean instance is passivated on completion of a transaction and the serialized form of a passivated bean instance is removed from the bean store on reactivation. As a result, following reactivation the only representation of the bean instance's state is in the reactivated bean instance in volatile memory. This ensures that a session bean instance can only exist in one place, is only accessible from a different server process in a completed transactional state, and becomes inaccessible if accessed in a transaction from a server process that failed before the transaction completed. This guarantees that a stateful session bean cannot be accessed if uncommitted transactional updates are lost and as a result the state accessible in a stateful session bean instance always reflects all updates. If an attempt is made to access a stateful session bean instance that has been become inaccessible in this manner, the requester receives a suitable exception, such as java.rmi.NosuchObjectException.

Figure 7:
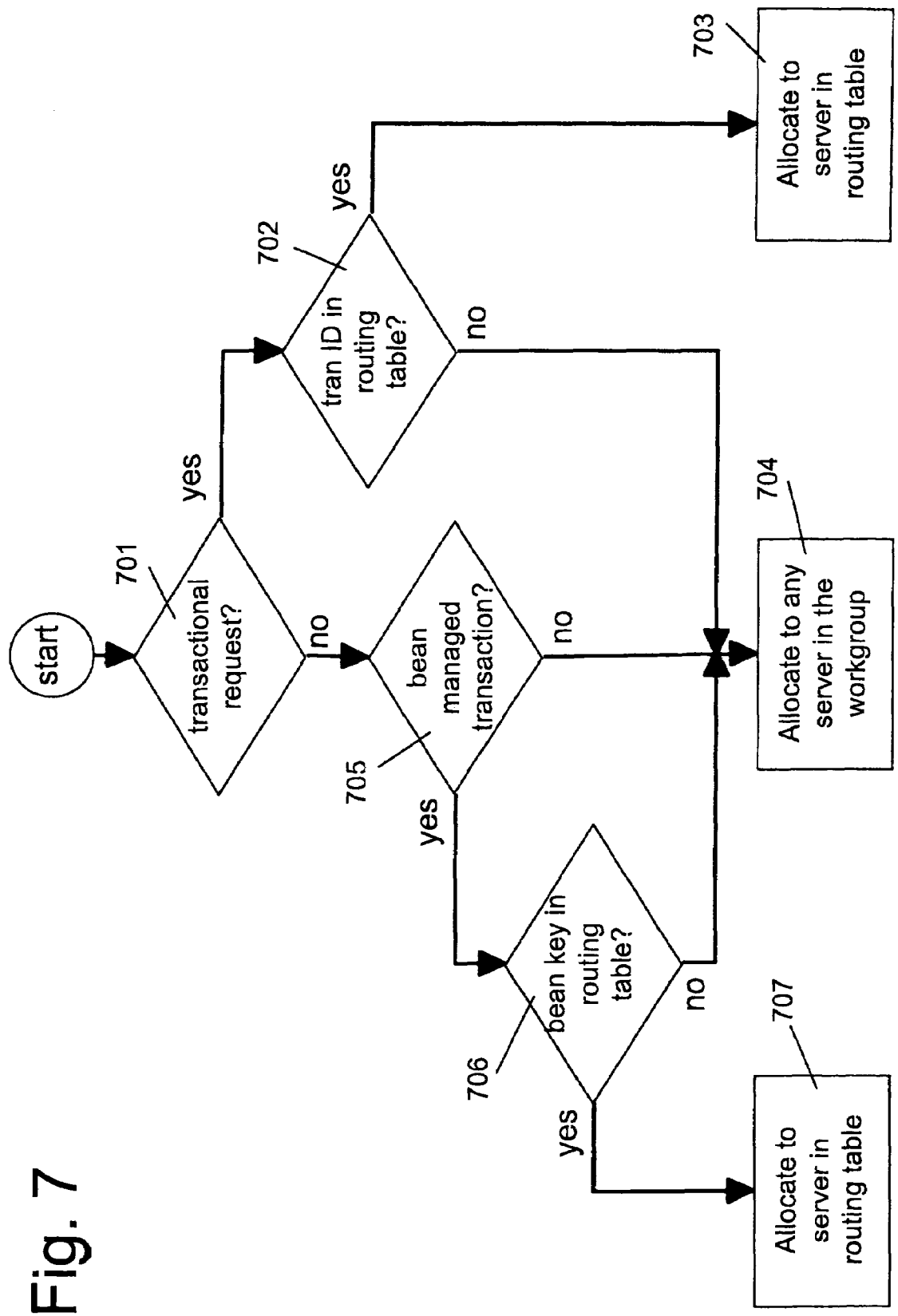
FIG. 7 is a flow chart of the logic followed by the workload management unit when allocating an inbound request to a server according to the preferred embodiment of the present invention.

FIG. 7 is shows the logic followed by the workload management unit when allocating an inbound request to a server process according to the preferred embodiment of the present invention. At step 701 a check is made to see if the request is transactional. If the request is transactional the transaction ID is obtained from the request and at step 702 the ID is compared with the transaction IDs in the routing table. If the ID is found, at step 703 the request is allocated to the server process specified in the routing table. If the ID is not found, at step 704 the request is allocated to any server process in the workgroup. If the request is not transactional, at step 705 a check is made to see if the request is targeted at a bean instance that is being accessed under a bean managed transaction. This information is available in a flag in the key of the bean instance. If this is the case the key of the bean instance is obtained from the request and, at step 706, compared with the bean instance keys in the routing table. If the key is found, at step 707 the request is allocated to the server specified in the routing table. If the key is not found at step 704 the request is allocated to any server process in the workgroup. If the key of the bean instance did not indicate the bean instance is being accessed under a bean managed transaction the routing table is not searched and the request is allocated to any server at step 704.

Note that the use of a flag in the bean instance's key, to indicate that the bean instance is being accessed under a bean managed transaction, is a performance optimisation. In the preferred embodiment the bean key will only be in the routing table if it is being accessed under a bean managed transaction. As a result, use of the flag means that is not necessary to search the routing table if the bean instance's key does not have the flag set. If the flag is not used, it would be necessary to check in the routing table for all the bean instance key of all inbound requests targeted at a bean instance.

It should be noted that the preferred embodiment uses a CORBA compliant OTS transaction as a way of denoting a unit of work. However, the present invention can also be applied to other types of unit of work such as different types of transaction, a session, a business method, a client request, or any other way of grouping one or more events into a unit. This is achieved by passivating a stateful session bean instance on completion of the chosen unit of work. Further, some implementations may employ a hierarchy of units of work. For example in the system described in the preferred embodiment where an OTS transaction is the chosen unit of work, in the absence of a transaction a business process method may also be used as a unit of work. If a client requests a business method outside the scope of a transaction and the business method accesses, directly or indirectly, a stateful session bean instance, the stateful session bean instance can be passivated on completion of the business method. Preferably this would be done during postInvoke processing of the business method called by the client. This then provides for workload management for client invoked business methods that involve stateful session bean instances.

It should further be noted that in the preferred embodiment, a stateful session beans is chosen as the preferred embodiment of an program entity type that maintains conversational state in memory. However, the invention could be applied to any type of entity that maintains state in memory, such as a Java bean or a C++ object, that requires workload management support.

The present invention is preferably embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

The invention claimed is:

1. In a data processing system having a nonvolatile memory storage device and at least one server, capable of running a server process, a method of data processing a program entity, comprising the steps of:

maintaining program entity instance location information in a routing table on said nonvolatile memory storage device, wherein said routing table is used on receipt of a request to access an instance of said program entity to route said request to one of a plurality of server processes in which said instance of said program entity is currently active or to route said request to any of said plurality of server processes when said instance of said program entity is currently passive in a program entity store;

associating a key with said instance of said program entity for use in identifying said instance of said program entity as a target for said request, wherein said key includes a flag to indicate the presence of said location information for said instance of said program entity in said routing table, and wherein when said flag is not set in said key on receipt of said request, said routing table is not searched for said location information of said instance of said program entity to reduce routing table searches for performance optimization;

passivating, as part of a first server process, an instance of said program entity by writing it to a program entity store, on said nonvolatile memory storage device, and removing it from said first server process;

reactivating, as part of a second server process, said instance of said program entity by reading it from said program entity store and re-creating it in said second server process; and selecting a server process from said plurality of server processes in which said instance of said program entity is reactivated according to a workload distribution algorithm using said routing table.

2. A method as claimed in claim 1 in which said first server process executes a unit of work on behalf of a client under which said program entity instance is accessed and said step of passivating passivates said program entity instance on completion of said unit of work.

3. A method as claimed in claim 2 wherein said unit of work comprises a transaction.

4. A method as claimed in claim 2 wherein said unit of work comprises a business method.

5. A method as claimed in any preceding claim wherein said program entity comprises a stateful session bean.

6. A method as claimed in claim 2 wherein said reactivating step reads and removes said instance of said program entity from said program entity store, thereby ensuring that if said program entity instance is reactivated under said unit of work it cannot be re-accessed outside said unit of work until said unit of work completes.

7. A computer program product stored on a computer readable storage medium, for use in a data processing system having a non-volatile memory storage device and at least one server, capable of running a server process, said product comprising instructions which, when executed, cause said system to process a program entity by carrying out the steps of:

maintaining program entity instance location information in a routing table on said nonvolatile memory storage device, wherein said routing table is used on receipt of a request to access an instance of said program entity to route said request to one of a plurality of server processes in which said instance of said program entity is currently active or to route said request to any of said plurality of server processes when said instance of said program entity is currently passive in a program entity store;

associating a key with said instance of said program entity for use in identifying said instance of said program entity as a target for said request, wherein said key includes a flag to indicate the presence of said location information for said instance of said program entity in said routing table, and wherein when said flag is not set in said key on receipt of said request, said routing table is not searched for said location information of said instance of said program entity to reduce routing table searches for performance optimization;

passivating, as part of a first server process, an instance of said program entity by writing it to a program entity store, on said nonvolatile memory storage device, and removing it from said first server process;

reactivating, as part of a second server process, said instance of said program entity by reading it from said program entity store and re-creating it in said second server process; and selecting a server process from said plurality of server processes in which said instance of said program entity is reactivated according to a workload distribution algorithm using said routing table.

8. A computer program product as claimed in claim 7 in which said first server process executes a unit of work on behalf of a client under which said program entity instance is accessed and said step of passivating passivates said program entity instance on completion of said unit of work.

9. A computer program product as claimed in claim 8 wherein said unit of work comprises a transaction.

10. A computer program product as claimed in claim 8 wherein said unit of work comprises a business method.

11. A computer program product as claimed in claim 7 wherein said program entity comprises a stateful session bean.

12. A computer program product as claimed in claim 8 wherein said reactivating step reads and removes said instance of said program entity from said program entity store, thereby ensuring that if said program entity instance is reactivated under said unit of work it cannot be re-accessed outside said unit of work until said unit of work completes.

13. A data processing system comprising:
at least one server;
a plurality of server processes, capable of running on said at least one server, each with support for a program entity; and
a non-volatile memory storage device, accessible to each server process;
wherein each server process comprises:
means for maintaining program entity instance location information in a routing table on said nonvolatile memory storage device, wherein said routing table is used on receipt of a request to access an instance of said program entity to route said request to one of a plurality of server processes in which said instance of said program entity is currently active or to route said request to any of said plurality of server processes when said instance of said program entity is currently passive in a program entity store;

means for associating a key with said instance of said program entity for use in identifying said instance of said program entity as a target for said request, wherein said key includes a flag to indicate the presence of said location information for said instance of said program entity in said routing table, and wherein when said flag is not set in said key on receipt of said request, said routing table is not searched for said location information of said instance of said program entity to reduce routing table searches for performance optimization;

means for passivating an instance of said program entity by writing it to a program entity store on said nonvolatile memory storage device;

means for reactivating an instance of said program entity by reading it from said program entity store and using it to recreate said instance of said program entity;

said means for reactivating being capable of reactivating program entity instances that were passivated by the passivating means of a different server process; and means for selecting a server process from said plurality of server processes in which said instance of said program entity is reactivated according to a workload distribution algorithm using said routing table.

14. A data processing system as claimed in claim 13, each of said plurality of server processes further comprising:
means to execute a unit of work on behalf of a client under which a first instance of said program entity is accessed;
wherein said means for passivating said instance of said program entity passivates said first instance of said program entity on completion of said unit of work.

15. A data processing system as claimed in claim 14, wherein said unit of work comprises a transaction.

16. A data processing system as claimed in claim 14, wherein said unit of work comprises a business method.

17. A data processing system as claimed in claim 13 wherein said program entity comprises a stateful session bean.

18. A data processing system as claimed in claim 14, wherein said reactivating means reads and removes an instance of said program entity from said program entity store, thereby ensuring that if said reactivating means reactivates said first program entity instance under said unit of work, said first program entity instance cannot be re-accessed outside said unit of work until said unit of work completes.

* * * * *